US010685605B2

(12) United States Patent
Na et al.

(10) Patent No.: US 10,685,605 B2
(45) Date of Patent: Jun. 16, 2020

(54) DISPLAY DEVICE INCLUDING SWITCHING UNIT CONNECTED WITH DATA LINE

(71) Applicant: Samsung Display Co., Ltd., Yongin-si (KR)

(72) Inventors: Ji Su Na, Yongin-si (KR); Hee Jin Jeon, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/058,800

(22) Filed: Aug. 8, 2018

(65) Prior Publication Data

US 2019/0189059 A1 Jun. 20, 2019

(30) Foreign Application Priority Data

Dec. 19, 2017 (KR) ........................ 10-2017-0175161

(51) Int. Cl.

| | |
|---|---|
| ***G06F 3/038*** | (2013.01) |
| ***G09G 3/3275*** | (2016.01) |
| ***G09G 3/3266*** | (2016.01) |
| ***G09G 3/3225*** | (2016.01) |
| *G09G 3/36* | (2006.01) |

(52) U.S. Cl.

CPC ......... *G09G 3/3275* (2013.01); *G09G 3/3225* (2013.01); *G09G 3/3266* (2013.01); *G09G 3/3677* (2013.01); *G09G 3/3688* (2013.01); *G09G 2310/0297* (2013.01); *G09G 2320/0209* (2013.01); *G09G 2320/0242* (2013.01)

(58) Field of Classification Search

CPC .. G09G 3/3275; G09G 3/3225; G09G 3/3266; G09G 3/3677

See application file for complete search history.

(56) References Cited

U.S. PATENT DOCUMENTS

| | | | | |
|---|---|---|---|---|
| 2009/0225009 A1* | 9/2009 | Ka ........................ | G09G 3/3233 345/76 |
| 2013/0181963 A1* | 7/2013 | Chuang ................ | G09G 3/3607 345/208 |
| 2014/0333676 A1* | 11/2014 | Fujii .................... | G09G 3/2003 345/690 |

(Continued)

FOREIGN PATENT DOCUMENTS

| | | |
|---|---|---|
| KR | 101127853 | 3/2012 |
| KR | 1020130075530 | 7/2013 |
| KR | 1020150060356 | 6/2015 |

*Primary Examiner* — Jonathan M Blancha

(74) *Attorney, Agent, or Firm* — Cantor Colburn LLP

(57) ABSTRACT

A display device includes a plurality of pixel columns, a plurality of switching units, a number of which corresponds to a number of the pixel columns, and a plurality of data lines of which a number is one more than the number of the pixel columns, where each of the switching units includes a first switch which transfers a data voltage to a first data line to which some of a plurality of pixels included in a corresponding pixel column are connected, and a second switch which transfers a data voltage to a second data line to which the other of the pixels included in the corresponding pixel column are connected, and a second switch included in a first switching unit among the switching units is connected with a first switch included in a second switching unit adjacent to the first switching unit.

15 Claims, 4 Drawing Sheets

(56) References Cited

U.S. PATENT DOCUMENTS

| | | | | |
|---|---|---|---|---|
| 2016/0042695 | A1* | 2/2016 | Park | G09G 3/3614 345/690 |
| 2017/0000374 | A1 | 1/2017 | ONeill et al. | |
| 2017/0262106 | A1* | 9/2017 | Yeh | G06F 3/0412 |

* cited by examiner

DISPLAY DEVICE INCLUDING SWITCHING UNIT CONNECTED WITH DATA LINE

This application claims priority to Korean Patent Application No. 10-2017-0175161, filed on Dec. 19, 2017, and all the benefits accruing therefrom under 35 U.S.C. § 119, the content of which in its entirety is herein incorporated by reference.

BACKGROUND

(a) Field

Exemplary embodiments of the invention relate to a display device, and more particularly, to a display device capable of improving charging efficiency of a data voltage.

(b) Description of the Related Art

As a display device technology is developed, a display device is becoming larger, higher in resolution, and higher in speed. Accordingly, gate signals need to be applied to more gate lines in a predetermined time, and a time for applying a data voltage to a pixel must be accordingly shortened. As the time for applying the data voltage to the pixel becomes short, the data voltage may not be sufficiently charged to the pixel, resulting in color crosstalk such that colors are deteriorated, and charging spots.

SUMMARY

Exemplary embodiments of the invention have been made in an effort to provide a display device capable of improving charging efficiency of a data voltage.

According to an exemplary embodiment of the invention, a display device includes a data driver which generates first and second data voltages, a first output line which includes a first end connected with the data driver and a second end connected with a first input node and receives the first data voltage corresponding to a first pixel column, a second output line which includes a first end connected with the data driver and a second end connected with a second input node and receives the second data voltage corresponding to a second pixel column, a first output node connected with a first data line, a second output node connected with a second data line adjacent to the first data line, a third output node connected with a third data line adjacent to the second data line, a first switching unit connected with the first input node, the first output node and the second output node, and which selectively transfers the first data voltage applied to the first output line, to the first data line and the second data line, and a second switching unit connected with the second input node, the second output node, and the third output node and selectively transfers the second data voltage applied to the second output line, to the second data line and the third data line.

The first switching unit may include a first switch which includes a gate electrode to which a first demux control signal is applied, a first electrode connected with the first input node, and a second electrode connected with the first output node, and a second switch which includes a gate electrode to which a second demux control signal is applied, a first electrode connected with the first input node, and a second electrode connected with the second output node.

The second switching unit may include a third switch which includes a gate electrode to which the first demux control signal is applied, a first electrode connected with the second input node, and a second electrode connected with the second output node, and a fourth switch which includes a gate electrode to which the second demux control signal is applied, a first electrode connected with the second input node, and a second electrode connected with the third output node.

The second demux control signal may be a reverse phase signal of the first demux control signal.

The first pixel column may include a plurality of first pixels positioned between the first data line and the second data line, the second pixel column may include a plurality of second pixels positioned between the second data line and the third data line, pixels positioned in an odd-numbered pixel row among the first pixels may be connected with the first data line, pixels positioned in an even-numbered pixel row among the first pixels may be connected with the second data line, pixels positioned in an odd-numbered pixel row among the second pixels may be connected with the second data line, and pixels positioned in an even-numbered pixel row among the second pixels may be connected with the third data line.

The display device may further include a plurality of gate lines connected with the first pixels and the second pixels, and a gate driver which sequentially applies gate signals of gate-on voltages to the gate lines, where the gate signals of gate-on voltages are applied during two horizontal periods, and two sequential gate signals of gate-on voltages among the gate signals of gate-on voltages overlap each other during one horizontal period.

The first switching unit may transfer the first data voltage to the first data line in response to a first demux control signal, and may transfer the first data voltage to the second data line in response to a second demux control signal, the second switching unit may transfer the second data voltage to the second data line in response to the first demux control signal, and may transfer the second data voltage to the third data line in response to the second demux control signal, each of the first demux control signal and the second demux control signal may be a combination of a gate-on voltage during one horizontal period and a gate-off voltage during another horizontal period, respectively, and the gate-on voltage may be a voltage turning on a switch included in the first or second switching unit.

The first demux control signal may be applied as the gate-on voltage at a time point when a gate signal applied to a gate line corresponding to the odd-numbered pixel row is applied as a gate-on voltage of the pixels in the odd-numbered pixel row among the first and second pixels.

The second demux control signal may be applied as the gate-on voltage at a time point when a gate signal applied to a gate line corresponding to the even-numbered pixel row is applied as a gate-on voltage of the pixels in the even-numbered pixel row among the first and second pixels.

The first demux control signal may be applied as the gate-on voltage after a predetermined preceding time since a time point when a gate signal is applied to a gate line corresponding to the odd-numbered pixel row is applied as a gate-on voltage of the pixels in the odd-numbered pixel row among the first and second pixels.

The second demux control signal may be applied as the gate-on voltage after the preceding time since a time point when a gate signal applied to a gate line corresponding to the even-numbered pixel row is applied as a gate-on voltage of the pixels in the even-numbered pixel row among the first and second pixels.

The preceding time may correspond to a time for changing a gate signal from a gate-off voltage to a gate-on voltage.

The preceding time may be one half of the horizontal period.

According to an exemplary embodiment of the invention, a display device includes a first pixel column which includes a plurality of first pixels arranged in a second direction, a second pixel column which is adjacent to the first pixel column and includes a plurality of second pixels arranged in the second direction, a first data line positioned at a first side of the first pixel column and which extends in the second direction, a second data line positioned between the first pixel column and the second pixel column and which extends in the second direction, a third data line positioned at a second side of the second pixel column and which extends in the second direction, a first switching unit which selectively applies a first data voltage applied to a first output line corresponding to the first pixel column, to the first data line and the second data line, and a second switching unit which selectively applies a second data voltage applied to a second output line corresponding to the second pixel column, to the second data line and the third data line.

Pixels positioned in an odd-numbered pixel row among the first pixels may be connected with the first data line, pixels positioned in an even-numbered pixel row among the first pixels may be connected with the second data line, pixels positioned in an odd-numbered pixel row among the second pixels may be connected with the second data line, and pixels positioned in an even-numbered pixel row among the second pixels may be connected with the third data line.

The second switching unit may transfer the second data voltage to the second data line when the first switching unit transfers the first data voltage to the first data line, and the second switching unit may transfer the second data voltage to the third data line when the first switching unit transfers the first data voltage to the second data line.

The display device may further include a plurality of gate lines connected with the first pixels and the second pixels to extend in a first direction which crosses the second direction, and a gate signal including a combination of a gate-on voltage and a gate-off voltage may be sequentially applied to the gate lines, gate signals of gate-on voltages may be applied during two horizontal periods, and two sequential gate signals of gate-on voltages among the gate signals of gate-on voltages may overlap each other during one horizontal period.

The first switching unit may transfer the first data voltage to the first data line in response to a first demux control signal, and may transfer the first data voltage to the second data line in response to a second demux control signal, the second switching unit may transfer the second data voltage to the second data line in response to the first demux control signal, and may transfer the second data voltage to the third data line in response to the second demux control signal, and each of the first demux control signal and the second demux control signal may be a combination of a gate-on voltage during one horizontal period and a gate-off voltage during another horizontal period.

According to an exemplary embodiment of the invention, a display device includes a plurality of pixel columns, a plurality of switching units, a number of which corresponds to a number of the pixel columns, and a plurality of data lines of which a number is one more than the number of the pixel columns, where each of the switching units includes a first switch which transfers a data voltage to a first data line to which some of a plurality of pixels included in a corresponding pixel column are connected, and a second switch which transfers a data voltage to a second data line to which the other of the pixels included in the corresponding pixel column are connected, and a second switch included in a first switching unit among the switching units is connected with a first switch included in a second switching unit adjacent to the first switching unit.

A data line connected with the second switch included in the first switching unit may be connected with the first switch included in the second switching unit.

It is thereby possible to increase a time for applying gate signals of gate-on voltages to the gate line, and it is possible to improve charging efficiency of a data voltage inputted to the pixels.

DETAILED DESCRIPTION

Hereinafter, exemplary embodiment of the invention will be described more fully with reference to the accompanying drawings, in which exemplary embodiments of the invention are shown. As those skilled in the art would realize, the described exemplary embodiments may be modified in various different ways, all without departing from the spirit or scope of the invention.

To clearly describe the invention, parts that are irrelevant to the description are omitted, and like numerals refer to like or similar constituent elements throughout the specification.

Further, since sizes and/or thicknesses of constituent members shown in the accompanying drawings are arbitrarily given for better understanding and ease of description, the invention is not limited to the illustrated sizes and thicknesses.

In addition, unless explicitly described to the contrary, the word “comprise” and variations such as “comprises” or “comprising” will be understood to imply the inclusion of stated elements but not the exclusion of any other elements.

It will be understood that, although the terms “first,” “second,” “third” etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, “a first element,” “component,” “region,” “layer” or “section” discussed below could be termed a second element, component, region, layer or section without departing from the teachings herein.

The terminology used herein is for the purpose of describing particular embodiments only and is not intended to be limiting. As used herein, the singular forms “a,” “an,” and “the” are intended to include the plural forms, including “at least one,” unless the content clearly indicates otherwise. “At least one” is not to be construed as limiting “a” or “an.” “Or” means “and/or.” As used herein, the term “and/or” includes any and all combinations of one or more of the associated listed items.

Hereinafter, a display device according to an exemplary embodiment of the invention will be described with reference to FIG. 1, an example of a pixel included in the display device will be described with reference to FIG. 2, and a driving method of the display device will be described with reference to FIG. 1 to FIG. 3.

Figure 1:
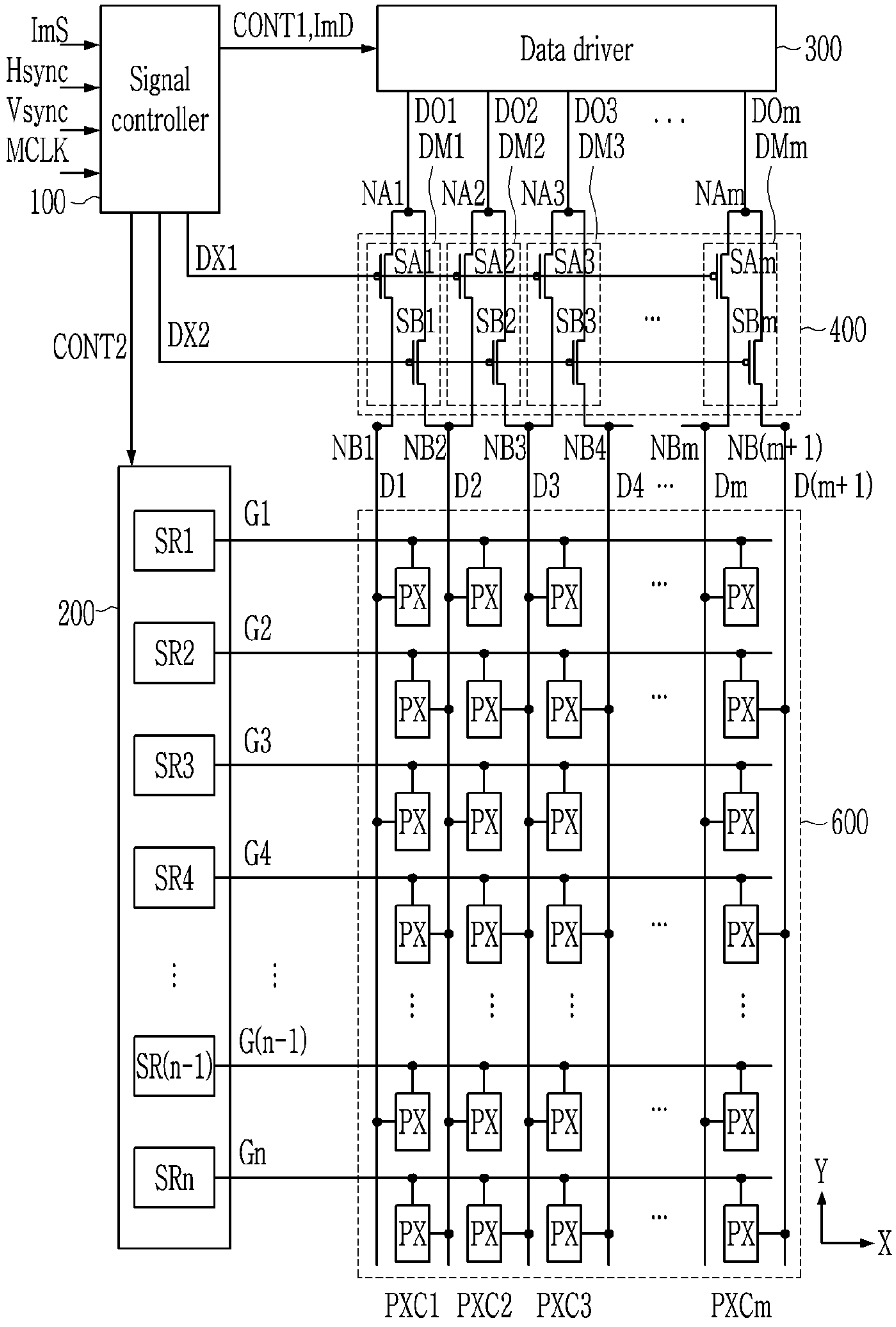
FIG. 1 illustrates an exemplary embodiment of a display device according to the invention.

FIG. 1 illustrates an exemplary embodiment of a display device according to the invention.

Referring to FIG. 1, the display device includes a signal controller 100, a gate driver 200, a data driver 300, a demultiplexer unit 400, and a display unit 600. The display device may be an emissive display device including an organic light emitting diode or an inorganic light emitting diode. Alternatively, the display device may be a liquid crystal display device.

The signal controller 100 receives an image signal ImS and synchronization signals input from an external device. The image signal ImS has luminance information of a plurality of pixels. The luminance has a predetermined number of gray levels, e.g., 1024 ($=2^{10}$), 256 ($=2^8$) or 64 ($=2^6$) gray levels. The synchronization signals may include a horizontal synchronization signal Hsync, a vertical synchronization signal Vsync, and a main clock signal MCLK.

The signal controller 100 may generate a first driving control signal CONT1, a second driving control signal CONT2, an image data signal ImD, and demux control signals DX1 and DX2 in response to the image signal ImS, the horizontal synchronizing signal Hsync, the vertical synchronization signal Vsync, and the main clock signal MCLK.

The signal controller 100 divides the image signal ImS by a frame unit in response to the vertical synchronization signal Vsync, divides the image signal ImS by a gate line unit in response to the horizontal synchronization signal Hsync, and then generates image data signals ImD. The signal controller 100 transfers the image data signal ImD to the data driver 300 together with the first driving control signal CONT1. The signal controller 100 transfers the second driving control signal CONT2 to the gate driver 200.

The display unit 600 includes a plurality of pixels PX arranged in a matrix form, a plurality of gate lines G1 to Gn extended substantially in a row direction X to be substantially parallel to each other, and a plurality of data lines D1 to Dm+1 extended substantially in a column direction Y to be substantially parallel to each other. The gate lines G1 to Gn and the data lines D1 to Dm+1 are connected with the plurality of pixels PX. Each of n and m is an integer of 2 or more. The row direction X may be a first direction, and the column direction Y may be a second direction. The first direction and the second direction may be perpendicular to each other. In addition, for convenience of description, the row direction X includes a left direction and a right direction.

In an exemplary embodiment, for example, the pixels PX may be arranged in an m×n matrix form, and each of n gate lines G1 to Gn may be connected to m pixels PX of a corresponding pixel row. The number m+1 of the data lines D1 to Dm+1 may be one more than the number m of pixel columns PXC1 to PXCm, and each of the data lines D1 to Dm+1 may be connected to some of the pixels PX of corresponding pixel columns. In this case, each of the pixels included in odd-numbered pixel rows connected with odd-numbered gate lines G1, G3, . . . , Gn−1 is connected to a data line adjacent to a first side (e.g., the left side) of the pixel among the data lines D1 to Dm, and each of the pixels included in even-numbered pixel rows connected with even-numbered gate lines G2, G4, . . . , Gn is connected to a data line adjacent to a second side (e.g., the right side) of the pixel among the data lines D2 to Dm+1. In the example shown in FIG. 1, n is an even number. However, n may be odd number in another exemplary embodiment.

Accordingly, n/2 pixels PX may be connected to each of the first data line D1 and the last m+1$^{th}$ data line Dm+1, and n pixels PX may be connected to each of the other data lines D2 to Dm.

The display unit 600 may be a display area in which an image is displayed depending on the gate signals applied to the gate lines G1 to Gn and the data voltages applied to the data lines D1 to Dm+1. A peripheral area other than the display area may be referred to as a non-display area.

Each of the pixels PX may emit light of one of the primary colors. An example of the primary colors may include three primary colors of red, green, and blue, and a desired color may be displayed as a spatial or temporal sum of these three primary colors. A color may be displayed by a red pixel that displays red, a green pixel that displays green, and a blue pixel that displays blue, and one red pixel, one green pixel, and one blue pixel are collectively referred to as one pixel. The primary colors may include yellow, cyan, magenta, and the like according to an exemplary embodiment.

The gate driver 200 is connected with the gate lines G1 to Gn, generates a plurality of gate signals in response to a second driving control signal CONT2, and applies the gate signals to the gate lines G1 to Gn. The second driving control signal CONT2 may include a plurality of clock signals, and the gate driver 200 may sequentially apply gate signals of gate-on voltages to the gate lines G1 to Gn in synchronization with the clock signals. The gate driver 200 may include a plurality of gate driving blocks SR1 to SRn. The gate driving blocks SR1 to SRn are connected with the gate lines G1 to Gn, respectively, and the gate driving blocks SR1 to SRn may sequentially apply the gate signals of gate-on voltages to the gate lines G1 to Gn.

The data driver 300 may sample and hold the image data signal ImD in response to the first driving control signal CONT1, and may generate a data voltage corresponding to the image data signal ImD. A plurality of output lines DO1 to DOm may be connected with the data driver 300, and the data driver 300 may apply the generated data voltages to the output lines DO1 to DOm. m output lines DO1 to DOm may be connected with the data driver 300 in correspondence to the m pixel columns PXC1 to PXCm. The data driver 300 may apply the data voltages corresponding to the m pixel columns PXC1 to PXCm to the m output lines DO1 to DOm.

Each of the output lines DO1 to DOm includes a first end connected with the data driver 300 and a second end connected with one of input nodes NA1 to Nam. As illustrated in FIG. 1, the first output line DO1 may include a first end connected with the data driver 300 and a second end connected with the first input node NA1. A data voltage corresponding to the first pixel column PXC1 may be applied to the first output line DO1. The second output line DO2 may include a first end connected with the data driver 300 and a second end connected with the second input node NA2. A data voltage corresponding to the second pixel column PXC2 may be applied to the second output line D02. The third output line DO3 may include a first end connected with the data driver 300 and a second end connected with the third input node NA3. A data voltage corresponding to the third pixel column PXC3 may be applied to the third output line D03. The m$^{th}$ output line DOm may include a first end connected with the data driver 300 and a second end connected with the m$^{th}$ input node NAm. A data voltage corresponding to the $m^{th}$ pixel column PXCm may be applied to the $m^{th}$ output line DOm.

It has been illustrated in FIG. 1 that the signal controller 100 and the data driver 300 are separately provided. However, according to another exemplary embodiment, the signal controller 100 may include the data driver 300, or the signal controller 100 and the data driver 300 may be integrated into a single driving IC.

The demultiplexer unit 400 may include a plurality of switching units DM1 to DMm connected with the output lines DO1 to DOm. The demultiplexer unit 400 may include m switching units DM1 to DMm in correspondence to the m pixel columns PXC1 to PXCm. The switching units DM1 to DMm may include first switches SA1 to SAm connected with data lines that are adjacent to first sides (e.g., left sides) of the corresponding pixel columns PXC1 to PXCm and second switches SB1 to SBm connected with data lines that are adjacent to second sides (e.g., right sides) of the corresponding pixel columns PXC1 to PXCm, respectively. A first demux control signal DX1 may be applied to a gate electrode of the first switches SA1 to SAm, and a second demux control signal DX2 may be applied to a gate electrode of the second switches SB1 to SBm.

As illustrated in FIG. 1, the first switch SA1 included in the first switching unit DM1 may include a gate electrode to which a first demux control signal DX1 is applied, a first electrode connected with the first input node NA1, and a second electrode connected with the first output node NB1. The first output node NB1 is connected with the first data line D1. The first data line D1 may be positioned at a first side (e.g., the left side) of the first pixel column PXC1. The first pixel column PXC1 may correspond to the first switching unit DM1 or the first output line D01. The first pixel column PXC1 may include pixels PX positioned between the first data line D1 and the second data line D2.

The second switch SB1 included in the first switching unit DM1 may include a gate electrode to which a second demux control signal DX2 is applied, a first electrode connected with the first input node NA1, and a second electrode connected with the second output node NB2. The second output node NB2 is connected with the second data line D2. The second data line D2 may be positioned at a second side (e.g., right side) of the first pixel column PXC1.

The first switch SA2 included in the second switching unit DM2 may include a gate electrode to which the first demux control signal DX1 is applied, a first electrode connected with the second input node NA2, and a second electrode connected with the second output node NB2. The second output node NB2 is connected with the second data line D2, and the second data line D2 may be positioned at a first side (e.g., the left side) of the second pixel column PXC2. The second pixel column PXC2 may correspond to the second switching unit DM2 or the second output line D02. The second pixel column PXC2 may include pixels PX positioned between the second data line D2 and the third data line D3. The second switch SB2 included in the second switching unit DM2 may include a gate electrode to which the second demux control signal DX2 is applied, a first electrode connected with the second input node NA2, and a second electrode connected with the third output node NB3. The third output node NB3 is connected with the third data line D3, and the third data line D3 may be positioned at a second side (e.g., right side) of the second pixel column PXC2.

The first switch SA3 included in the third switching unit DM3 may include a gate electrode to which the first demux control signal DX1 is applied, a first electrode connected with the third input node NA3, and a second electrode connected with the third output node NB3. The third output node NB3 is connected with the third data line D3. The third data line D3 may be positioned at a first side (e.g., the left side) of the third pixel column PXC3. The third pixel column PXC3 corresponds to the third switching unit DM3 or the third output line D03. The third pixel column PXC3 may include pixels PX positioned between the third data line D3 and the fourth data line D4. A second electrode of the first switch SA3 included in the third switching unit DM3 is connected with the second electrode of the second switch SB2 included in the second switching unit DM2 through the third output node NB3.

The second switch SB3 included in the third switching unit DM3 may include a gate electrode to which the second demux control signal DX2 is applied, a first electrode connected with the third input node NA3, and a second electrode connected with the fourth output node NB4. The fourth output node NB4 may be connected with the fourth data line D4, and the fourth data line D4 may be positioned at a second side (e.g., right side) of the third pixel column PXC3.

The first switch SAm included in the $m^{th}$ switching unit DMm may include a gate electrode to which the first demux control signal DX1 is applied, a first electrode connected with the $m^{th}$ input node Nam, and a second electrode connected with the $m^{th}$ output node NBm. The $m^{th}$ output node NBm is connected with the $m^{th}$ data line Dm. The $m^{th}$ data line Dm may be positioned at a first side (e.g., the left side) of the $m^{th}$ pixel column PXCm. The $m^{th}$ pixel column PXCm may correspond to the $m^{th}$ switching unit DMm or the $m^{th}$ output line DOm. The $m^{th}$ pixel column PXCm may include pixels PX positioned between the $m^{th}$ data line Dm and the $m+1^{th}$ data line Dm+1. A second electrode of the first switch SAm included in the $m^{th}$ switching unit DMm is connected with a second electrode of a second switch included in an $n-1^{th}$ switching unit (not illustrated) through an $m^{th}$ output node NBm.

The second switch SBm included in the $m^{th}$ switching unit DMm may include a gate electrode to which the second demux control signal DX2 is applied, a first electrode connected with the $m^{th}$ input node Nam, and a second electrode connected with the $m+1^{th}$ output node NBm+1. The $m+1^{th}$ output node NBm+1 may be connected with the $m+1^{th}$ data line Dm+1, and the $m+1^{th}$ data line Dm+1 may be positioned at a second side (e.g., the right side) of the $m^{th}$ pixel column PXCm.

As such, first switches SA1 to SAm of the switching units DM1 to DMm may connect the data lines D1 to Dm positioned in first sides (e.g., left sides) of the corresponding pixel columns PXC1 to PXCm to the corresponding output lines DO1 to Dom, respectively. The second switches SB1 to SBm of the switching units DM1 to DMm may connect the data lines D2 to Dm+1 positioned at second sides (e.g., right sides) of the corresponding pixel columns PXC1 to PXCm to the corresponding output lines DO1 to Dom, respectively. Second electrodes of the first switches SA2 to SAm may be connected with second electrodes of the second switches SB1 to SBm−1 of the adjacent switching units DM1 to DMm−1, respectively. In this case, the first switch SA1 of the first switching unit DM1 may be connected to only the first data line D1, and the second switch SBm of the $m^{th}$ switching unit DMm may be connected with only the last $m+1^{th}$ data line Dm+1.

The first switches SA1 to SAm may transfer data voltages applied to the output lines DO1 to Dom to the data lines D1 to Dm adjacent to first sides (e.g., left sides) of the corresponding pixel columns PXC1 to PXCm in response to the first demux control signal DX1. The second switches SB1 to SBm may transfer data voltages applied to the output lines DO1 to DOm to the data lines D2 to Dm+1 adjacent to the second sides (e.g., right sides) of the corresponding pixel columns PXC1 to PXCm in response to the second demux control signal DX2.

The first switches SA1 to SAm and the second switches SB1 to SBm may be p-channel electric field effect transistors. The p-channel electric field effect transistors are turned on by low-level voltages applied to the gate electrodes thereof, and are turned off by high-level voltages applied to the gate electrodes. Alternatively, the first switches SA1 to SAm or the second switches SB1 to SBm may be n-channel electric field effect transistors according to another exemplary embodiment. The n-channel electric field effect transistors are turned off by high-level voltages applied to the gate electrodes thereof, and are turned off by low-level voltages applied to the gate electrodes. Hereinafter, an example in which the first switches SA1 to SAm and the second switches SB1 to SBm may be p-channel electric field effect transistors will be described.

Figure 2:
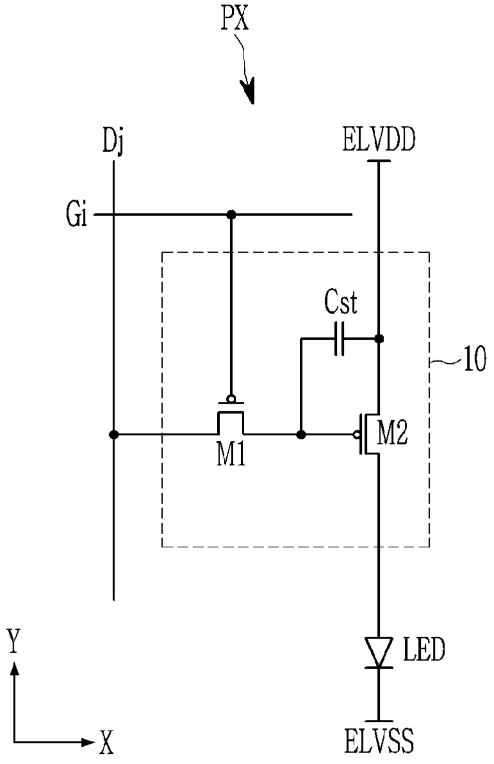
FIG. 2 illustrates an exemplary embodiment of a pixel according to the invention.

FIG. 2 illustrates an exemplary embodiment of a pixel according to the invention.

A pixel PX connected with i-th gate line Gi of the gate lines G1 to Gm and j-th data line Dj of the data lines D1 to Dm+1 illustrated in FIG. 1 will be described reference to FIG. 2.

The pixel PX includes a pixel circuit 10 and a light-emitting diode LED. The pixel circuit 10 may include a switching transistor M1, a driving transistor M2, and a storage capacitor Cst.

The switching transistor M1 includes a gate electrode connected with the gate line Gi, a first electrode connected with the data line Dj, and a second electrode connected with a gate electrode of the driving transistor M2. The switching transistor M1 is turned on by the gate signal of the gate-on voltage applied to the gate line Gi, and then transfers the data voltage applied to the data line Dj to the gate electrode of the driving transistor M2.

The driving transistor M2 includes the gate electrode connected with the second electrode of the switching transistor M1, a first electrode connected with a line supplying the first power voltage ELVDD, and a second electrode connected with the light-emitting diode LED. The driving transistor M2 allows a current corresponding to a data voltage applied to the gate electrode to flow in the light-emitting diode LED.

The storage capacitor Cst includes a first electrode connected with the line supplying the first power voltage ELVDD and a second electrode connected with the gate electrode of the driving transistor M2. The storage capacitor Cst may serve to maintain a data voltage applied to the driving transistor M2.

The light-emitting diode LED may include an anode connected with the second end of the driving transistor M2, a cathode connected with a line supplying the second power voltage ELVSS, and an emission layer positioned between the anode and the cathode. The first power voltage ELVDD may be a high-level voltage and the second power voltage ELVSS may be a low-level voltage. The emission layer may include at least one of an organic emission material and an inorganic emission material. The light-emitting diode LED may be an organic light emitting diode including an organic emission material or an inorganic light emitting diode having an inorganic emission material.

The switching transistor M1 and the driving transistor M2 may be p-channel electric field effect transistors. Alternatively, the switching transistor M1 or the driving transistor M2 may be n-channel electric field effect transistors according to another exemplary embodiment. Hereinafter, an example in which the switching transistor M1 and the driving transistor M2 are the p-channel electric field effect transistors will be described.

The pixel PX described in FIG. 2 is merely an example for explaining the driving method of the display device, and the structure of the pixel PX is not limited thereto. A pixel PX of various structures can be applied to the display device in other exemplary embodiments.

Hereinafter, an exemplary embodiment of a driving method of the display device will be described with reference to FIG. 1 to FIG. 3.

Figure 3:
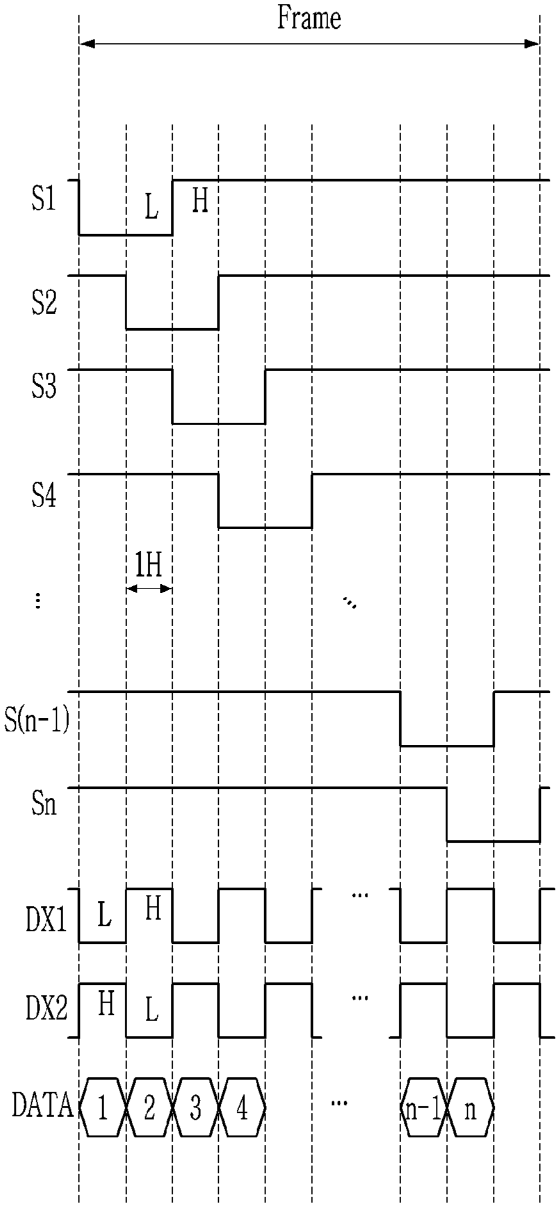
FIG. 3 is a timing diagram illustrating an exemplary embodiment of a driving method of the display device of FIG. 1 according to the invention.

FIG. 3 is a timing diagram illustrating an exemplary embodiment of a driving method of the display device of FIG. 1 according to the invention.

Referring to FIG. 1 to FIG. 3, the gate driver 200 applies the gate signals S1 to Sn to the gate lines G1 to Gn, respectively. The gate signals S1 to Sn may include a gate-on voltage of a low-level L and a gate-off voltage of a high-level H. The gate signals S1 to Sn of the gate-on voltages may be applied to the gate lines G1 to Gn, sequentially. The gate-on voltage of each of the gate signals S1 to Sn may be applied during two horizontal periods, and one gate signal of the gate-on voltage and the next gate signal of the gate-on voltage may overlap each other during one horizontal period 1H. The one horizontal period 1H may be the same as one period of the horizontal synchronizing signal Hsync.

In an exemplary embodiment, for example, the first gate signal S1 provided to the first gate line G1 is applied as a gate-on voltage during two horizontal periods, and the second gate signal S2 provided to the second gate line G2 is applied as a gate-on voltage after one horizontal period 1H since a time point at which the first gate signal S1 of the gate-on voltage is applied. The third gate signal S3 provided to the third gate line G3 is applied as a gate-on voltage after one horizontal period 1H since a time point at which the second gate signal S2 of the gate-on voltage is applied. In this way, the gate signals S1 to Sn of the gate-on voltage may be sequentially applied to the first gate line G1 to the $n^{th}$ gate line Gn.

The first demux control signal DX1 and the second demux control signal DX2 may be a combination of the gate-on voltage of the low-level L and the gate-off voltage of the high-level H, respectively. The first demux control signal DX1 may be a clock signal by which the gate-on voltage of one horizontal period and the gate-off voltage of one horizontal period are repeatedly applied. The second demux control signal DX2 may be a reverse phase signal of the first demux control signal DX1.

In an exemplary embodiment, for example, the first demux control signal DX1 may be applied as a gate-on voltage for the first switches SA1 to SAm during one horizontal period 1H after a time point at which the first gate signal S1 starts to be supplied as the gate-on voltage for the pixels PX in the first pixel row, may be applied as a gate-off voltage for the first switches SA1 to SAm during a next one horizontal period 1H, and may be repeatedly changed between the gate-on voltage and the gate-off voltage for the first switches SA1 to SAm at an interval of one horizontal period. The second demux control signal DX2 may be applied as a gate-off voltage of the second switches SB1 to SBm during one horizontal period after a time point at which the first gate signal S1 starts to be supplied as the gate-on voltage for the pixels PX in the first pixel row, may be applied as a gate-on voltage of the second switches SB1 to SBm during a next one horizontal period, and may be repeatedly changed between the gate-on voltage and the gate-off voltage of the second switches SB1 to SBm at an interval of one horizontal period.

Both the switching transistor M1 of each of the pixels PX connected with the first gate line G1 and the first switches SA1 to SAm of the switching units DM1 to DMm are turned on during one horizontal period 1H since the first gate signal S1 and the first demux control signal DX1 start to be applied as the gate-on voltage of the pixels PX connected with the first gate line G1 and the gate-on voltage of the first switches SA1 to SAm, respectively. During this one horizontal period, the data driver 300 outputs a first data voltage DATA(1) to the output lines DO1 to DOm, and the first data voltage DATA(1) is transferred to the data lines D1 to Dm through the first switches SA1 to SAm. The data lines D1 to Dm may be data lines except the last m+1$^{th}$ data line Dm+1 among all of the data lines D1 to Dm+1. In other words, the first data voltage DATA(1) corresponding to a first pixel row including the pixels PX connected with the first gate line G1 may be transferred to the data lines D1 to Dm through the first switches SA1 to Sam during the one horizontal period. The pixels PX connected with the first gate line G1 may be connected with the data lines D1 to Dm adjacent to first sides (e.g., the left sides) thereof, respectively, and thus the first data voltage DATA(1) transferred to the data lines D1 to Dm through the first switches SA1 to SAm may be inputted into the pixels PX connected with the first gate line G1. The first data voltage DATA(1) may be transferred to the driving transistor M2 through the switching transistor M1 of each pixel PX, and the pixels PX included in the first pixel row may emit light having a luminance corresponding to the first data voltage DATA(1).

Next, the switching transistor M1 of each of the pixels PX connected with the second gate line G2 and the second switches SB1 to SBm of the switching units DM1 to DMm are turned on during one horizontal period 1H since the second gate signal S2 and the second demux control signal DX2 start to be applied as the gate-on voltages of the pixels PX connected with the second gate line G2 and the gate-on voltage of the second switches SB1 to SBm, respectively. During this second horizontal period, the first gate signal S1 maintains the gate-on voltage and the first demux control signal DX1 is changed to the gate-off voltage. The data driver 300 outputs the second data voltage DATA(2) to the output lines DO1 to DOm, and the second data voltage DATA(2) is transferred to the data lines D2 to Dm+1 through the second switches SB1 to SBm. The data lines D2 to Dm+1 may be the data lines except the first data line D1 among all of the data lines D1 to Dm+1. In other words, the second data voltage DATA(2) corresponding to a second pixel row including the pixels PX connected with the second gate line G2 may be transferred to the data lines D2 to Dm+1 through the second switches SB1 to SBm during the second horizontal period. The pixels PX connected with the second gate line G2 may be connected with the data lines D2 to Dm+1 adjacent to second sides (e.g., the right sides) thereof, respectively, and thus the second data voltage DATA(2) transferred to the data lines D2 to Dm+1 through the second switches SB1 to SBm may be inputted into the pixels PX connected with the second gate line G2. The second data voltage DATA(2) may be transferred to the driving transistor M2 through the switching transistor M1 of each pixel PX, and the pixels PX included in the second pixel row may emit light having a luminance corresponding to the second data voltage DATA(2).

Next, the switching transistor M1 of each of the pixels connected with the third gate line G3 and the first switches SA1 to SAm of the switching units DM1 to DMm are turned on during the first horizontal period 1H since the third gate signal S3 and the first demux control signal DX1 start to be applied as the gate-on voltages of the pixels PX connected with the third gate line G3 and the gate-on voltage of the first switches SA1 to SAm, respectively. During this third horizontal period, the second gate signal S2 maintains the gate-on voltage and the second demux control signal DX2 is changed to the gate-off voltage. The data driver 300 outputs the third data voltage DATA(3) to the output lines DO1 to DOm, and the third data voltage DATA(3) is transferred to the data lines D1 to Dm through the first switches SA1 to SAm. In other words, the third data voltage DATA(3) corresponding to a third pixel row including the pixels PX connected with the third gate line G3 may be transferred to the data lines D1 to Dm through the first switches SA1 to Sam during the third horizontal period. The pixels PX connected with the third gate line G3 may be connected with the data lines D1 to Dm adjacent to first sides (e.g., the left sides) thereof, respectively, and thus the third data voltage DATA(3) transferred to the data lines D1 to Dm through the first switches SA1 to SAm may be inputted into the pixels PX connected with the third gate line G3. The third data voltage DATA(3) may be transferred to the driving transistor M2 through the switching transistor M1 of each pixel PX, and the pixels PX included in the third pixel row may emit light having a luminance corresponding to the third data voltage DATA(3).

Next, the switching transistor M1 of each of the pixels PX connected with the fourth gate line G4 and the second switches SB1 to SBm of the switching units DM1 to DMm are turned on during one horizontal period 1H since the fourth gate signal S4 and the second demux control signal DX2 start to be applied as the gate-on voltages of the pixels PX connected with the fourth gate line G4 and the gate-on voltage of the second switches SB1 to SBm, respectively. During this fourth horizontal period, the third gate signal S3 maintains the gate-on voltage and the first demux control signal DX1 is changed to the gate-off voltage. The data driver 300 outputs the fourth data voltage DATA(4) to the output lines DO1 to DOm, and the fourth data voltage DATA(4) is transferred to the data lines D2 to Dm+1 through the second switches SB1 to SBm. In other words, the fourth data voltage DATA(4) corresponding to a fourth pixel row including the pixels PX connected with the fourth gate line G4 may be transferred to the data lines D2 to Dm+1 through the second switches SB1 to SBm during the fourth horizontal period. The pixels PX connected with the fourth gate line G4 may be connected with the data lines D2 to Dm+1 adjacent to second sides (e.g., the right sides) thereof, respectively, and thus the fourth data voltage DATA(4) transferred to the second group data lines D2 to Dm+1 through the second switches SB1 to SBm may be inputted into the pixels PX connected with the fourth gate line G4. The fourth data voltage DATA(4) may be transferred to the driving transistor M2 through the switching transistor M1 of each pixel PX, and the pixels PX included in the fourth pixel row may emit light having a luminance corresponding to the fourth data voltage DATA(4).

In this way, the data voltages DATA may be sequentially inputted into the pixels PX from the first pixel row to the n$^{th}$ pixel row during one frame. As described above, as the data voltages DATA are applied to the pixels PX connected with the odd-numbered gate lines G1, G3, . . . , Gn−1 through the data lines D1 to Dm and are applied to the pixels PX connected with the even-numbered gate lines G2, G4, . . . , Gn through the data lines D2 to Dm+1, the gate-on voltage of each of the gate signals S1 to Sn may be maintained during two horizontal periods.

The gate signals S1 to Sn are sequentially outputted from the sequentially-connected gate driving blocks SR1 to SRn, and are changed from the low-level voltage to the high-level voltage or from the high-level voltage to the low-level voltage. The data voltages DATA are simultaneously outputted from the data driver 300 to the output lines DO1 to DOm, and each data voltage varies by an amount corresponding to a difference from the previous data voltage DATA outputted earlier. Accordingly, the data voltages DATA are quickly charged into the data lines D1 to Dm+1, while the gate signals S1 to Sn are charged or discharged to the gate lines G1 to Gn relatively slowly.

In the case that a time duration for applying each of the gate signals S1 to Sn as the gate-on voltage is one horizontal period, a time duration for actually applying the data voltage DATA to the pixels PX may be a time duration except for both a time duration during which the gate signal is changed from the gate-off voltage to the gate-on voltage and a time duration during which the gate signal is changed from the gate-on voltage to the gate-off voltage among one horizontal period.

However, as described above, as each of the gate signals S1 to Sn of gate-on voltages is maintained during two horizontal periods in exemplary embodiments according to the invention, a time duration for actually applying the data voltage DATA to the pixels PX may be all of the remaining time except the time duration for changing the gate signal from the gate-off voltage to the gate-on voltage among one horizontal period. As a result, it is possible to increase the time for applying the data voltage DATA to the pixels PX, and it is possible to improve charging efficiency of the data voltage DATA applied to the pixels PX.

Hereinafter, a driving method of the display device of FIG. 1 according to another exemplary embodiment will be described with reference to FIG. 4. A difference from the features described in FIG. 3 will be mainly described.

Figure 4:
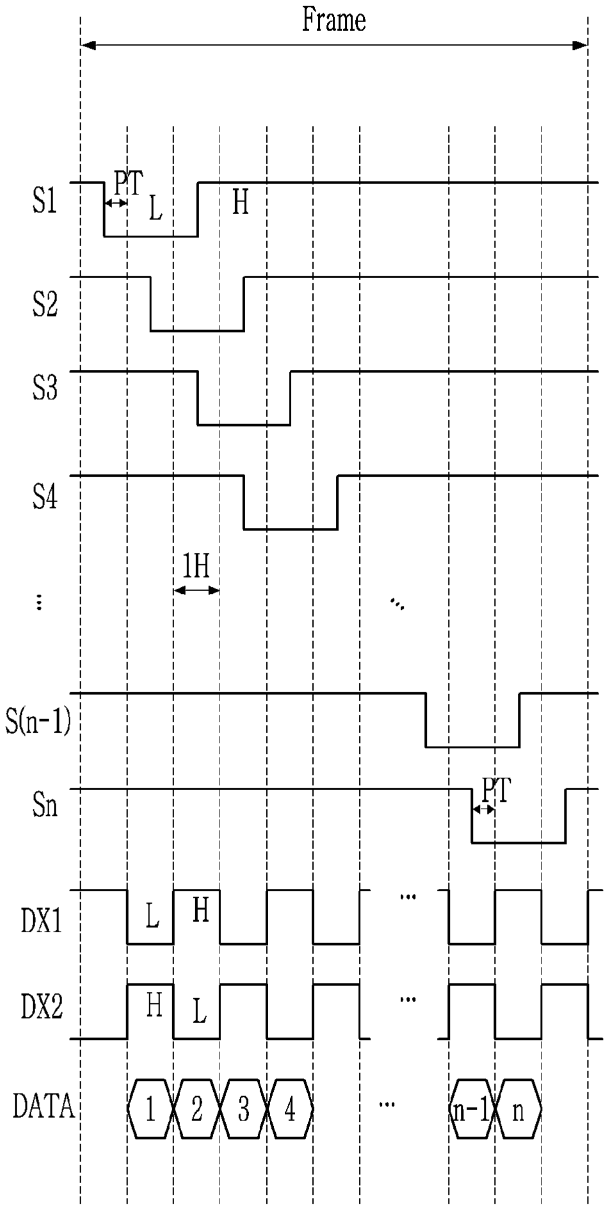
FIG. 4 is a timing diagram illustrating another exemplary embodiment of a driving method of the display device of FIG. 1 according to the invention.

FIG. 4 is a timing diagram illustrating another exemplary embodiment of a driving method of the display device of FIG. 1 according to the invention.

Referring to FIG. 4, a time point at which the first gate signal S1 of the gate-on voltage for the pixels PX in the first pixel row is applied may be earlier than a time point at which the first demux control signal DX1 is applied as the gate-on voltage for the first switches SA1 to SAm by a preceding time PT. In other words, the first demux control signal DX1 is applied as the gate-on voltage for the first switches SA1 to SAm after the preceding time PT from the time point at which the first gate signal S1 of the gate-on voltage for the pixels PX in the first pixel row is applied.

A time point at which the second gate signal S2 of the gate-on voltage for the pixels PX in the second pixel row is applied may be earlier than a time point at which the second demux control signal DX2 is applied as the gate-on voltage for the second switches SB1 to SBm by the preceding time PT. In other words, the second demux control signal DX2 may be applied as the gate-on voltage after the preceding time PT since the time point at which the second gate signal S2 of the gate-on voltage starts to be applied.

In addition, a time point at which the third gate signal S3 of the gate-on voltage for the pixels PX in the third pixel row is applied may be earlier than a time point at which the first demux control signal DX1 is changed to the gate-on voltage by the preceding time PT. In other words, the first demux control signal DX1 may be changed to the gate-on voltage after the preceding time PT since the time point at which the third gate signal S3 of the gate-on voltage starts to be applied.

A time point at which the fourth gate signal S4 of the gate-on voltage for the pixels PX in the fourth pixel row is applied may be earlier than a time point at which the second demux control signal DX2 is changed to the gate-on voltage by the preceding time PT. In other words, the second demux control signal DX2 may be changed to the gate-on voltage after the preceding time PT since the time point at which the fourth gate signal S4 of the gate-on voltage starts to be applied.

As a result, a time point at which the gate signals S1 to Sn of gate-on voltages starts to be applied may be earlier than a time point at which the corresponding first demux control signal DX1 or second demux control signal DX2 is changed to the gate-on voltage by the preceding time PT.

The preceding time PT may be approximately one half of a horizontal period. Alternatively, the preceding time PT may correspond to a time for changing each of the gate signals S1 to Sn from the gate-off voltage to the gate-on voltage.

Accordingly, the gate signals S1 to Sn are changed from the gate-off voltage to the gate-on voltage during the preceding time PT, and then the data voltage DATA may be applied to the data lines D1 to Dm+1 to be inputted into the pixels PX during one horizontal period during which the gate signals S1 to Sn are maintained as the gate-on voltage. In addition, the data voltage DATA may be inputted into the pixels PX during one horizontal period, and the gate signals S1 to Sn may be changed from the gate-on voltage to the gate-off voltage during the remaining time. As a result, the data voltage DATA may be inputted into the pixels PX regardless of a time for changing the gate signals S1 to Sn from the gate-off voltage to the gate-on voltage or from the gate-on voltage to the gate-off voltage.

The features described in the exemplary embodiments of FIG. 1 to FIG. 3 except for the above differences may be applied to the exemplary embodiment of FIG. 4, and thus overlapping descriptions between the embodiments will be omitted.

While this invention has been described in connection with what is considered to be practical exemplary embodiments, it is to be understood that the invention is not limited to the disclosed embodiments, but, on the contrary, is intended to cover various modifications and equivalent arrangements included within the spirit and scope of the appended claims. Therefore, those skilled in the art will understand that various modifications and other equivalent embodiments of the invention are possible. Consequently, the true technical protective scope of the invention must be determined based on the technical spirit of the appended claims.

What is claimed is:

1. A display device comprising:

a data driver which generates first and second data voltages;

a first output line which includes a first end connected with the data driver and a second end connected with a first input node, and receives the first data voltage corresponding to a first pixel column;

a second output line which includes a first end connected with the data driver and a second end connected with a second input node, and receives the second data voltage corresponding to a second pixel column;

a first output node connected with a first data line;

a second output node connected with a second data line adjacent to the first data line;

a third output node connected with a third data line adjacent to the second data line;

a first switching unit connected with the first input node, the first output node and the second output node, and which selectively transfers the first data voltage applied to the first output line, to the first data line or the second data line; and a second switching unit connected with the second input node, the second output node and the third output node, and which selectively transfers the second data voltage applied to the second output line, to the second data line or the third data line, wherein the number of switches between the first output line and the second data line is one, and the number of switches between the second output line and the second data line is one, the first switching unit transfers a first data voltage to the first data line in response to a first demux control signal, and transfers the first data voltage to the second data line in response to a second demux control signal, the second switching unit transfers a second data voltage to the second data line in response to the first demux control signal, and transfers the second data voltage to the third data line in response to the second demux control signal, the first demux control signal is applied as a gate-on voltage after a predetermined preceding time since a time point when a gate signal applied to a gate line corresponding to an odd-numbered pixel row is applied as a gate-on voltage of pixels in the odd-numbered pixel row, the second demux control signal is applied as a gate-on voltage after the preceding time since a time point when a gate signal applied to a gate line corresponding to an even-numbered pixel row is applied as a gate-on voltage of pixels in the even-numbered pixel row, and the preceding time corresponds to a time for changing a gate signal from a gate-off voltage to a gate-on voltage.

2. The display device of claim 1, wherein the first switching unit includes:

a first switch which includes a gate electrode to which the first demux control signal is applied, a first electrode connected with the first input node, and a second electrode connected with the first output node; and a second switch which includes a gate electrode to which the second demux control signal is applied, a first electrode connected with the first input node, and a second electrode connected with the second output node.

3. The display device of claim 2, wherein the second switching unit includes:

a third switch which includes a gate electrode to which the first demux control signal is applied, a first electrode connected with the second input node, and a second electrode connected with the second output node; and a fourth switch which includes a gate electrode to which the second demux control signal is applied, a first electrode connected with the second input node, and a second electrode connected with the third output node.

4. The display device of claim 3, wherein the second demux control signal is a reverse phase signal of the first demux control signal.

5. The display device of claim 1, wherein the first pixel column includes a plurality of first pixels positioned between the first data line and the second data line, the second pixel column includes a plurality of second pixels positioned between the second data line and the third data line, pixels positioned in an odd-numbered pixel row among the first pixels are connected with the first data line, pixels positioned in an even-numbered pixel row among the first pixels are connected with the second data line, pixels positioned in an odd-numbered pixel row among the second pixels are connected with the second data line, and pixels positioned in an even-numbered pixel row among the second pixels are connected with the third data line.

6. The display device of claim 5, further comprising:

a plurality of gate lines connected with the first pixels and the second pixels; and a gate driver which sequentially applies gate signals of gate-on voltages to the gate lines, wherein the gate signals of gate-on voltages are applied during two horizontal periods, and two sequential gate signals of gate-on voltages among the gate signals of gate-on voltages overlap each other during one horizontal period.

7. The display device of claim 6, wherein each of the first demux control signal and the second demux control signal is a combination of a gate-on voltage during one horizontal period and a gate-off voltage during another horizontal period, respectively, and the gate-on voltage is a voltage turning on a switch included in the first or second switching unit.

8. The display device of claim 7, wherein the preceding time is one half of the horizontal period.

9. A display device comprising:

a first pixel column which includes a plurality of first pixels arranged in a second direction;

a second pixel column which is adjacent to the first pixel column and includes a plurality of second pixels arranged in the second direction;

a first data line positioned at a first side of the first pixel column and which extends in the second direction;

a second data line positioned between the first pixel column and the second pixel column and which extends in the second direction;

a third data line positioned at a second side of the second pixel column and which extends in the second direction;

a first switching unit which selectively applies a first data voltage applied to a first output line corresponding to the first pixel column, to the first data line or the second data line; and a second switching unit which selectively applies a second data voltage applied to a second output line corresponding to the second pixel column, to the second data line or the third data line, wherein the number of switches between the first output line and the second data line is one, and the number of switches between the second output line and the second data line is one, the first switching unit transfers the first data voltage to the first data line in response to a first demux control signal, and transfers the first data voltage to the second date line in response to a second demux control signal, the second switching unit transfers the second data voltage to the second data line in response to the first demux control signal, and transfers the second data voltage to the third date line in response to the second demux control signal, the first demux control signal is applied as a gate-on voltage after a predetermined preceding time since a time point when a gate signal applied to a gate line corresponding to an odd-numbered pixel row is applied as a gate-on voltage of pixels in the odd-numbered pixel row among the first and second pixels, the second demux control signal is applied as a gate-on voltage after the preceding time since a time point when a gate signal applied to a gate line corresponding to an even-numbered pixel row is applied as a gate-on voltage of pixels in the even-numbered pixel row among the first and second pixels, and the preceding time corresponds to a time for changing a gate signal from a gate-off voltage to a gate-on voltage.

10. The display device of claim 9, wherein pixels positioned in an odd-numbered pixel row among the first pixels are connected with the first data line, pixels positioned in an even-numbered pixel row among the first pixels are connected with the second data line, pixels positioned in an odd-numbered pixel row among the second pixels are connected with the second data line, and pixels positioned in an even-numbered pixel row among second pixels are connected with the third data line.

11. The display device of claim 10, wherein the second switching unit transfers the second data voltage to the second data line when the first switching unit transfers the first data voltage to the first data line, and the second switching unit transfers the second data voltage to the third data line when the first switching unit transfers the first data voltage to the second data line.

12. The display device of claim 10, further comprising a plurality of gate lines connected with the first pixels and the second pixels to extend in a first direction which crosses the second direction, and wherein a gate signal including a combination of a gate-on voltage and a gate-off voltage is sequentially applied to the gate lines, gate signals of gate-on voltages are applied during two horizontal periods, and two sequential gate signals of gate-on voltages among the gate signals of gate-on voltages overlap each other during one horizontal period.

13. The display device of claim 12, wherein each of the first demux control signal and the second demux control signal is a combination of a gate-on voltage during one horizontal period and a gate-off voltage during another horizontal period.

14. A display device comprising:

a plurality of pixel columns;

a plurality of switching units, a number of which corresponds to a number of the pixel columns; and a plurality of data lines of which a number is one more than the number of the pixel columns, wherein each of the switching units includes:

a first switch which transfers a data voltage to a first data line to which some, not all, of a plurality of pixels included in a corresponding pixel column are connected; and a second switch which transfers a data voltage to a second data line to which the other, not all, of the pixels included in the corresponding pixel column are connected, and wherein a second switch included in a first switching unit among the switching units is connected with a first switch included in a second switching unit adjacent to the first switching unit at a node a data line of the data lines is directly connected with, the first switching unit transfers a first data voltage to the first data line in response to a first demux control signal, and transfers the first data voltage to the second date line in response to a second demux control signal, the second switching unit transfers a second data voltage to the second data line in response to the first demux control signal, and transfers the second data voltage to the third date line in response to the second demux control signal, the first demux control signal is applied as a gate-on voltage after a predetermined preceding time since a time point when a gate signal applied to a gate line corresponding to an odd-numbered pixel row is applied as a gate-on voltage of pixels in the odd-numbered pixel row, the second demux control signal is applied as a gate-on voltage after the preceding time since a time point when a gate signal applied to a gate line corresponding to an even-numbered pixel row is applied as a gate-on voltage of pixels in the even-numbered pixel row, and the preceding time corresponds to a time for changing a gate signal from a gate-off voltage to a gate-on voltage.

15. The display device of claim 14, wherein a data line connected with the second switch included in the first switching unit is connected with the first switch included in the second switching unit.

* * * * *